(12) United States Patent  
Niigata

(10) Patent No.: US 9,160,498 B2
(45) Date of Patent: Oct. 13, 2015

(54) TRANSMISSION UNIT AND DIAGNOSIS METHOD

(71) Applicant: FUJITSU LIMITED, Kawasaki-shi, Kanagawa (JP)

(72) Inventor: Katsuya Niigata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/952,745

(22) Filed: Jul. 29, 2013

(65) Prior Publication Data

US 2014/0079108 A1 Mar. 20, 2014

(30) Foreign Application Priority Data

Sep. 19, 2012 (JP) ................................. 2012-205425

(51) Int. Cl.
*H04B 3/46* (2015.01)
*H04L 1/24* (2006.01)

(52) U.S. Cl.
CPC . *H04L 1/242* (2013.01); *H04L 1/24* (2013.01)

(58) Field of Classification Search
CPC ............. H04L 1/242; H04L 1/24; H04L 1/20; H04B 3/46; H04B 17/0042; H04B 17/004
USPC .................. 375/224, 316, 296; 370/240, 241; 702/119
See application file for complete search history.

(56) References Cited

U.S. PATENT DOCUMENTS

| | | | |
|---|---|---|---|
| 8,582,443 B1 * | 11/2013 | Sun et al. ....................... | 370/242 |
| 2005/0083067 A1 * | 4/2005 | Kirbas ........................ | 324/539 |
| 2007/0041454 A1 | 2/2007 | Yamazaki | |
| 2008/0010061 A1 * | 1/2008 | Kjorling et al. ............... | 704/201 |
| 2008/0010661 A1 * | 1/2008 | Kappler et al. ............... | 725/120 |
| 2009/0028229 A1 | 1/2009 | Cagno et al. | |
| 2010/0002587 A1 * | 1/2010 | Ray Noble et al. ........... | 370/241 |

FOREIGN PATENT DOCUMENTS

| | | |
|---|---|---|
| JP | 2007-053648 | 3/2007 |
| JP | 2008-027240 | 2/2008 |
| JP | 2010-536194 | 11/2010 |
| JP | 2011-108006 | 6/2011 |

* cited by examiner

*Primary Examiner* — Zewdu Kassa
(74) *Attorney, Agent, or Firm* — Fujitsu Patent Center

(57) ABSTRACT

A transmission unit connected to a reception unit via a communication cable. The transmission unit includes: a diagnostic data transmitting section to transmit, to the reception unit via the communication cable, diagnostic data converted into signals under a signal conversion condition for a diagnosis, of which a value of at least one parameter is different from a signal conversion condition for a transmission defined as a data-to-signal conversion condition for transmitting data to the reception unit; and a diagnosing section to diagnose a status of the communication cable on the basis of a diagnostic data error rate measured by the reception unit receiving the diagnostic data.

12 Claims, 9 Drawing Sheets

AMPLITUDE VARIATION OF Emp $Emp = 20 \times \log_{10}(Amp/VMA)$

TRANSMISSION UNIT AND DIAGNOSIS METHOD

CROSS-REFERENCE TO RELATED APPLICATION

This application is based upon and claims the benefit of priority of the prior Japanese Patent Application No. 2012-205425, filed on Sep. 19, 2012, the entire contents of which are incorporated herein by reference.

FIELD

The present invention is related to a transmission unit, a diagnosis method and a non-transitory computer-readable recording medium.

BACKGROUND

There exist some number of information processing apparatuses configured by connecting two types of units (devices) via a communication cable. A mass-production test for this type of information processing apparatus is implemented in the form of reattaching the communication cable to another two units undergoing the test next time from the two units with the test being completed, but a transmission error abruptly frequently occurs when the communication cable is repeatedly inserted and removed as the case may be.

The transmission error, however, occurs even if a trouble is caused on the unit side, and hence, it is the status quo to perform an operation of determining at first whether the transmission error is caused by the communication cable or on the unit side (an operation of troubleshooting the error portion distinctively).

PRIOR ART DOCUMENTS

Patent document 1: Japanese Patent Application Laid-Open Publication No. 2007-53648
Patent document 2: Japanese National Publication of International Patent Application No. 2010-536194
Patent document 3: Japanese Patent Application Laid-Open Publication No. 2011-108006
Patent document 4: Japanese Patent Application Laid-Open Publication No. 2008-27240

The operation of troubleshooting the error portion is a highly time-consuming process. It is therefore desirable to implement a mass-production test for the information processing apparatus like the above in such a form that the transmission error is not caused surely by the communication cable.

Further, the communication cable becomes easy to cause the transmission error in an electrode portion thereof if used for a long period of time even without being inserted and removed repeatedly. Moreover, if the transmission error occurs during an actual operation of the information processing apparatus configured by connecting the two types of units via the communication cable, in addition to a necessity for troubleshooting the error portion distinctively for a repair thereof, it follows that a user cannot use the information processing apparatus.

SUMMARY

According to an aspect of the embodiments, a transmission unit connected to a reception unit via a communication cable, includes: a diagnostic data transmitting section to transmit, to the reception unit via the communication cable, diagnostic data converted into signals under a signal conversion condition for a diagnosis, of which a value of at least one parameter is different from a signal conversion condition for a transmission defined as a data-to-signal conversion condition for transmitting data to the reception unit; and a diagnosing section to diagnose a status of the communication cable on the basis of a diagnostic data error rate measured by the reception unit receiving the diagnostic data.

According to another aspect of the embodiments, a diagnosis method of diagnosing a communication cable connecting a transmission unit to a reception unit, includes: transmitting, via the communication cable from the transmission unit to the reception unit, diagnostic data converted into signals under a signal conversion condition for a diagnosis, of which a value of at least one parameter is different from a signal conversion condition for a transmission defined as a data-to-signal conversion condition for transmitting data to the reception unit; and diagnosing a status of the communication cable on the basis of a diagnostic data error rate measured by the reception unit receiving the diagnostic data.

According to still another aspect of the embodiments, a non-transitory computer-readable recording medium having stored therein a program for a transmission unit including a processor and a communication part to convert bit information into signal and to transmit the signal via a communication cable to a reception unit, the program causing the processor to execute a process including: transmitting, by the communication part, diagnostic data converted into signals under a signal conversion condition for a diagnosis, of which a value of at least one parameter is different from a signal conversion condition for a transmission defined as a data-to-signal conversion condition for transmitting data to the reception unit; and diagnosing a status of the communication cable on the basis of a diagnostic data error rate measured by the reception unit receiving the diagnostic data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Some embodiments of the present invention will hereinafter be described in detail with reference to the drawings.

≤≤First Embodiment≥≥

To start with, an outline (a configuration and a usage mode) of a transmission unit 10 according to a first embodiment will be described by use of FIG. 1.

Figure 1:
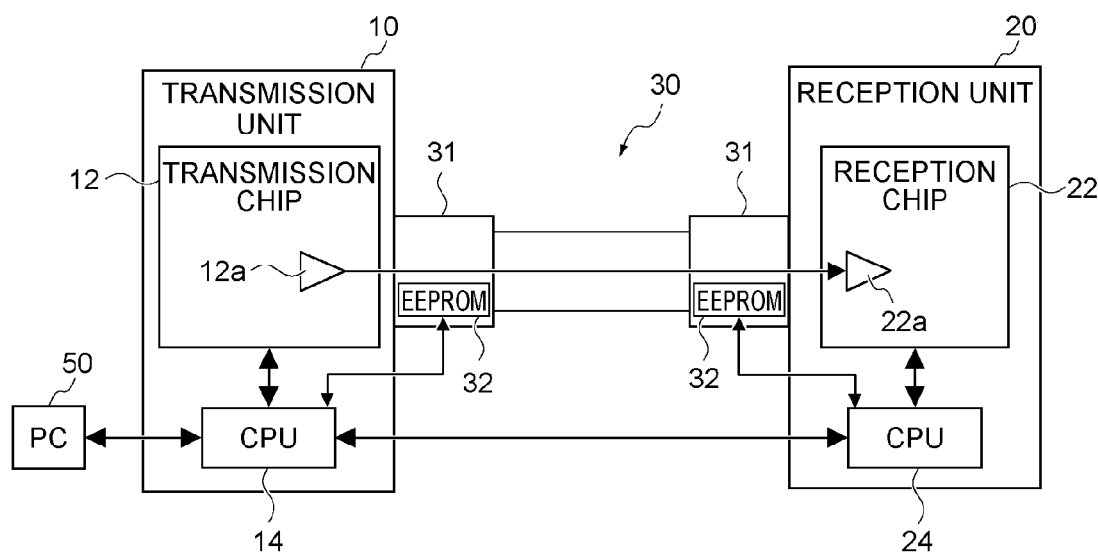
FIG. 1 is an explanatory diagram of a configuration and a usage mode of a transmission unit according to a first embodiment.

As illustrated in FIG. 1, the transmission unit 10 according to the first embodiment is a device that is connected to a reception unit 20 via a communication cable 30. Further, the transmission unit 10 is also the device connected to a PC (Personal Computer) 50 and the reception unit 20 via a cable (e.g., a LAN (Local Area Network) cable) different from the communication cable 30.

The communication cable 30 is a cable (e.g., a Serial Attached SCSI (Small Computer System Interface) cable) used for transferring data to the reception unit 20 from the transmission unit 10. Each of cable pads 31 of this communication cable 30 is provided with an EEPROM (Electrically Erasable Programmable Read Only Memory) 32 retaining specification information etc. of the communication cable 30.

The reception unit 20 is a unit that executes a process (a process of, e.g., storing the received data in a subordinate hard disk drive) based on the data received via the communication cable 30.

As illustrated in FIG. 1, the reception unit 20 includes a reception chip 22 and a CPU 24. Note that the reception unit 20 includes also, though their illustrations are omitted, a RAM (Random Access Memory), a nonvolatile storage device (a flash ROM (Read Only Memory) etc.) stored with a reception-side diagnosis program (an in-depth description thereof will be made later on) and an IF (interface) circuit for the EEPROM 32. The reception unit 20 still further includes an IF circuit (e.g., a LAN-IF circuit) for performing communications with a CPU 14 within the transmission unit 10.

The reception chip 22 is an IC (Integrated Circuit) chip including a receiver 22a that converts signals transmitted via the communication cable 30 into data (bit information). This reception chip 22 has a function of measuring, when receiving diagnostic data, a bit error rate (which will hereinafter be abbreviated to BER) thereof and notifying the CPU 24 of this BER. Note that the diagnostic data connotes data transmitted by the transmission unit 10 in order to diagnose a status of the communication cable 30.

The CPU 24 is a processor that executes a variety of processes in accordance with various categories of programs (such as the reception-side diagnosis program mentioned above).

As depicted in FIG. 1, the transmission unit 10 includes a transmission chip 12 and the CPU 14. The transmission unit 10 includes, though their illustrations are omitted, a RAM, a nonvolatile storage device stored with a transmission-side diagnosis program (of which an in-depth description will be made later on), an IF circuit for the EEPROM 32 and an IF circuit for performing the communications between the PC 50 and the CPU 24 within the reception unit 20.

Figure 2:
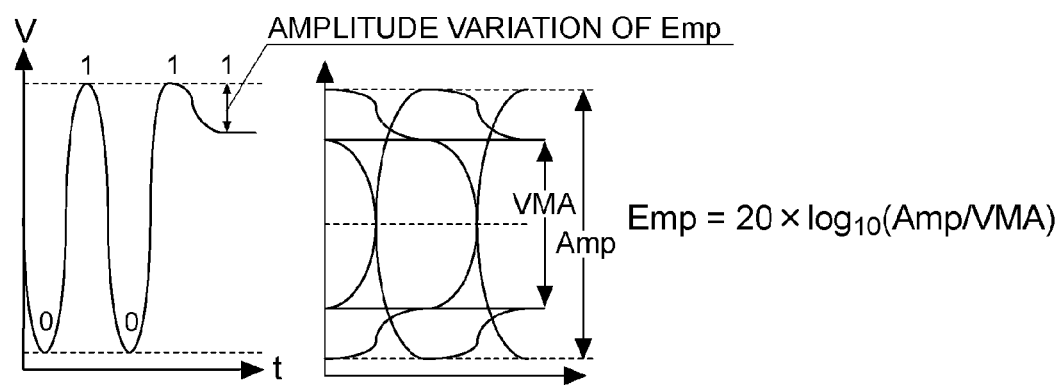
FIG. 2 is an explanatory diagram of an emphasis.

The transmission chip 12 is an IC chip including a driver 12a etc., which converts the data (bit information) into the signals (voltage waveforms) and thus transmits the converted signals onto the communication cable 30. This transmission chip 12 is configured as the chip capable of setting a voltage amplitude Amp, an emphasis Emp, etc. as parameters for specifying data-to-signal converting conditions. Herein, the emphasis Emp connotes a parameter that specifies, as illustrated in FIG. 2, a variation of the amplitude in a case where a frequency is low (a case of a continuity of ones). More specifically, on a fast transmission path, an attenuation of the signal is different (an inter-symbol interference occurs) depending on a bit pattern (frequency), and hence the amplitude is varied in a way that predicts the attenuation beforehand from the bit pattern. The emphasis Emp connotes a parameter that specifies the variation on that occasion.

Operations (applications and contents of the transmission- and reception-side diagnosis programs) of the transmission unit 10 and the reception unit 20 will hereinafter be described.

The transmission-side diagnosis program in the transmission unit 10 and the reception-side diagnosis program in the reception unit 20 are programs executed when implementing a mass-production test.

Herein, the mass-production test is a test for examining whether the manufactured transmission unit 10 and the manufacture reception unit 20 function normally or not by use of the same communication cable 30 (in the form of reattaching the communication cable 30 to the two units undergoing the next test from the two units with their test being completed).

Figure 3:
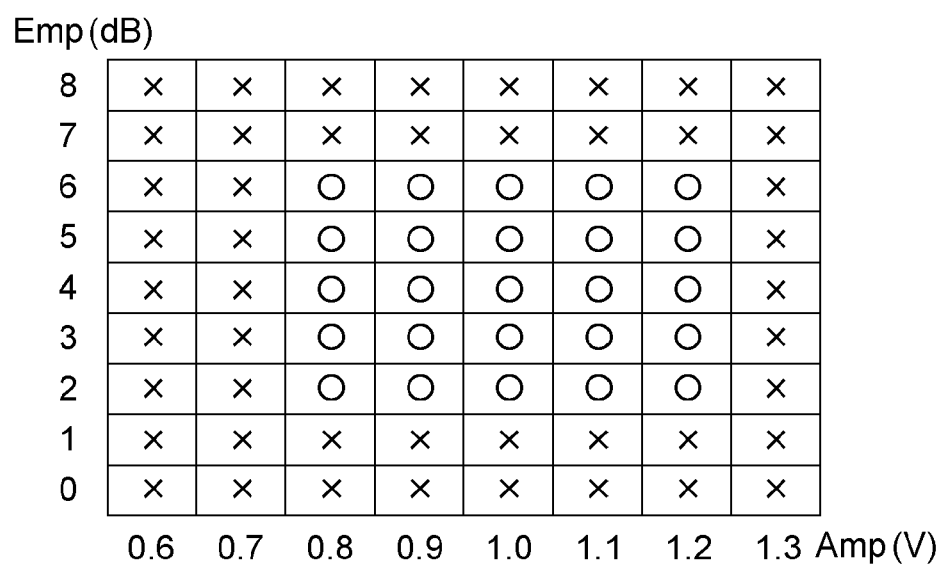
FIG. 3 is an explanatory diagram of a BER profile.

The implementation of the mass-production test for the transmission unit 10 and the reception unit 20 according to the first embodiment, involves previously conducting an operation of writing a BER (bit error rate) profile to the EEPROM 32 (on the side of the transmission unit 10) of the communication cable 30 used for the mass-production test. Herein, the BER profile represents information indicating, as schematically depicted in FIG. 3, with respect to each of a plurality of signal conversion conditions (a combination of the Emp-value and Amp-value), whether the BER of the diagnostic data undergoing the signal conversion under this signal conversion condition and being thus transmitted is equal to or smaller than a system request value ("circle") or not ("cross").

The operation (which will hereinafter be referred to as a BER profile writing operation) is carried out by exploiting generally the transmission unit 10 and the reception unit 20, which can be confirmed to function normally. To be specific, when performing the BER profile writing operation, at first, the transmission unit 10 and the reception unit 20, which can be confirmed to function normally, are connected via the BER profile writing target communication cable 30.

Subsequently, the CPU 14 is made to execute a BER profile generating program. Herein, the BER profile generating program connotes a program by which the CPU 14 operates as follows.

The CPU 14, which starts executing the BER profile generating program, at first, with respect to each of the plurality of signal conversion conditions, gets the transmission chip 12 to convert the diagnostic data into the signals under the signal conversion condition and to thus transmit the signals, and thereafter executes a process of receiving determination result information about the diagnostic data from the CPU 24 and storing the received information on the RAM (which will hereinafter be also termed a BER test). Note that "the determination result information" is information indicating whether the BER transmitted to the CPU 14 is equal to or smaller than a system request value or not each time the CPU 24 executing the reception-side diagnosis program is notified of the BER of the diagnostic data from the reception chip 22.

The CPU 14 writes, when completing the BER test with respect to all the signal conversion conditions (see FIG. 3), to the EEPROM 32 the BER profile having the contents corresponding to the determination result information that is collected from the BER test, and finishes the operation based on the BER profile generating program.

When implementing the mass-production test for a certain pair of the transmission unit 10 and the reception unit 20, these units are connected via the communication cable (about which the BER profile writing operation has been conducted). Then, the PC 50 is operated to get the CPU 14 in the transmission unit 10 to execute the transmission-side diagnosis program and to get the CPU 24 in the reception unit 20 to execute the reception-side diagnosis program.

Upon executing the reception-side diagnosis program, the CPU 24, whenever being notified of the BER of the diagnostic data from the reception chip 22, determines whether the BER is equal to or smaller than the system request value set in the reception-side diagnosis program or not, and comes to a status of notifying the CPU 14 of the determination result information indicating the determination result.

Figure 4:
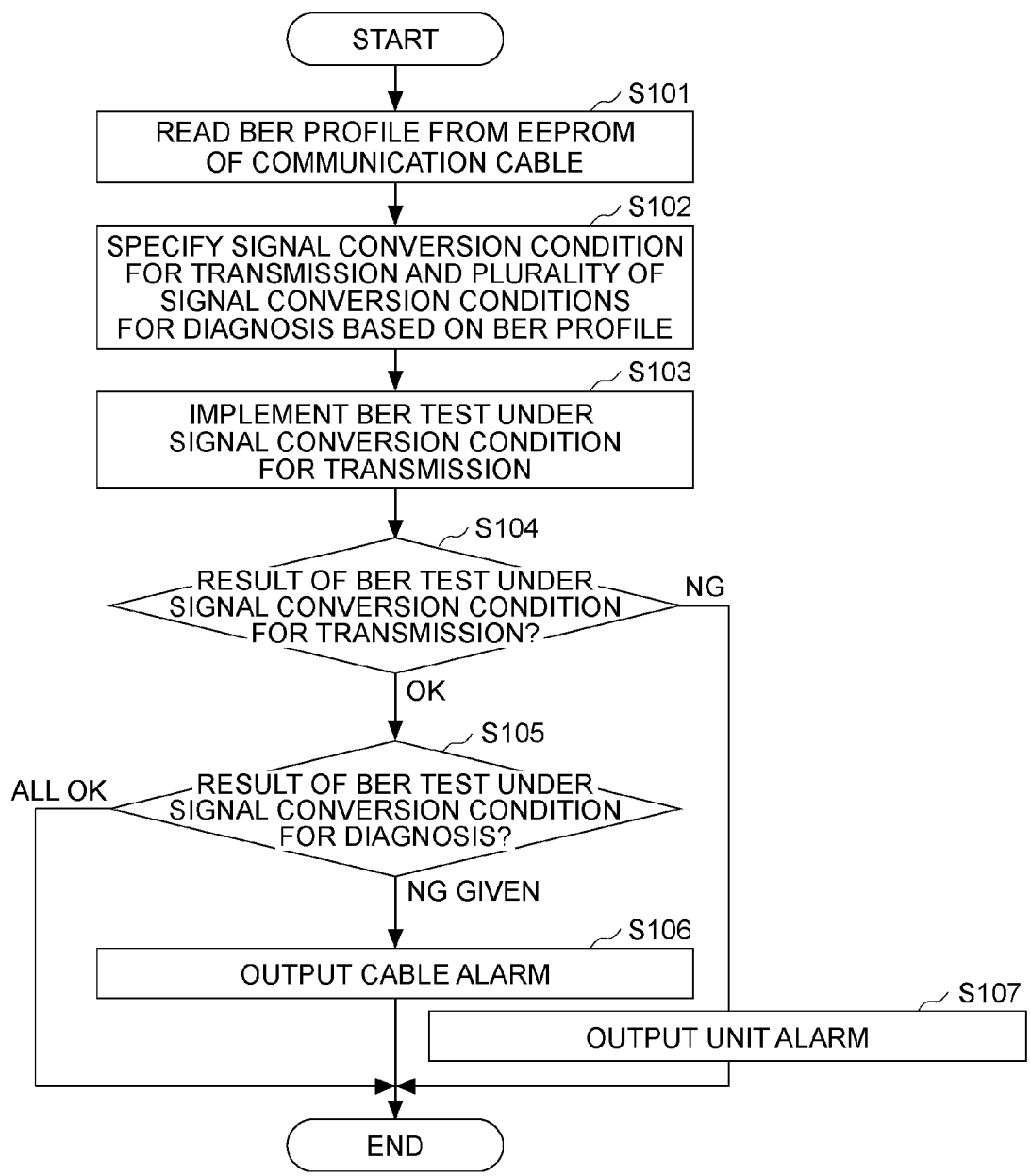
FIG. 4 is a flowchart of a diagnosis process executed by a CPU in the transmission unit according to the first embodiment.

The CPU 14, which has executed the transmission-side diagnosis program, carries out a diagnosis process taking a procedure illustrated in FIG. 4.

To be specific, the CPU 14 starting this diagnosis process reads, at first, the BER profile (FIG. 3) from the EEPROM 32 of the communication cable 30 (step S101).

Next, the CPU 14 executes a process of specifying the signal conversion condition for the transmission and the plurality of signal conversion conditions for the diagnosis on the basis of the readout BER profile (step S102).

Concretely, when executing the process in step S102, the CPU 14, to begin with, specifies the signal conversion condition with the largest margin (which is the signal conversion condition positioned substantially at the center of a signal conversion condition group marked with circles in FIG. 3). Then, the CPU 14 stores, on the RAM, a purport that the specified signal conversion condition is defined as the signal conversion condition for the transmission. Further, when arranging the respective signal conversion conditions as illustrated in FIG. 3 (that is, when arranged in matrix in the sequence of the Amp values and in the sequence of the Emp values), the CPU 14 stores, on the RAM, the purport that each signal conversion condition adjacent to the signal conversion condition for the transmission is defined as the signal conversion condition for the diagnosis.

Figure 5:
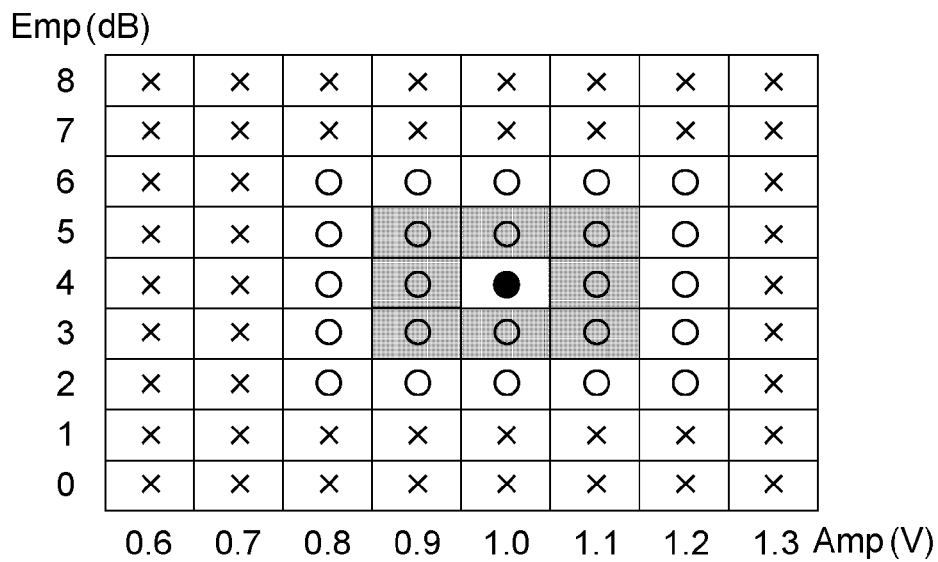
FIG. 5 is an explanatory diagram of a relationship between the BER profile and a signal conversion condition for a transmission etc.

The CPU 14, which has finished the process in step S102, performs the BER test under each specified signal conversion condition (each signal conversion condition stored as the signal conversion condition for the transmission/diagnosis on the RAM) (step S103). Namely, the CPU 14 performs the BER test under the signal conversion condition for the transmission as marked with a filled circle in FIG. 5 and the BER test under each of the signal conversion conditions for the diagnosis that are indicated in the form of half-tone dot meshing in FIG. 5. Note that the BER test is, as already explained, the process of receiving, after getting the transmission chip 12 to convert the diagnostic data into the signals under a certain signal conversion condition and transmitting the converted signals, the determination result information with respect to the transmitted diagnostic data and storing the received information on the RAM.

In the case of completing the BER tests with respect to all the signal conversion conditions (the signal conversion condition for the transmission and the eight signal conversion conditions of the diagnosis), the CPU 14 determines whether a result of the BER test under the signal conversion condition for the transmission is OK or NG (step S104 in FIG. 4). More specifically, the CPU 14 determines whether the determination result information received from the reception unit 20 when implementing the BER test under the signal conversion condition for the transmission is information indicating that the BER is equal to or smaller than the system request value or information indicating that the BER exceeds the system request value.

If the result of the BER test under the signal conversion condition for the transmission is OK (step S104; OK), the CPU 14 determines whether or not all the results of the BER tests under the signal conversion conditions for the diagnosis are "OK" (step S105).

Then, the CPU 14, if all the results of the BER tests under the signal conversion conditions for the diagnosis are OK (All OK; step S105), finishes this diagnosis process (the process in FIG. 4) without executing any process in particular.

Whereas if one or more results of the BER test under one or more signal conversion conditions for the diagnosis are NG (NG given; step S105), the CPU 14 displays a "cable alarm" on the display of the PC 50 (step S106). Herein, the "cable alarm" is a message of a purport of reaching an undesirable status where the communication cable 30 continues to be used (a purport of its being desirable for the next pair to be inspected by use of a new communication cable 30).

Then, the CPU 14, which has finished the process in step S106, terminates this diagnosis process.

Further, if the result of the BER test under the signal conversion condition for the transmission is NG (NG; step S104), the CPU 14 displays a "unit alarm" indicating that a trouble exists in the transmission unit 10 and/or the reception unit 20 on the display of the PC 50 (step S107). Then, the CPU 14, which has finished the process in step S107, terminates this diagnosis process.

Figure 6:
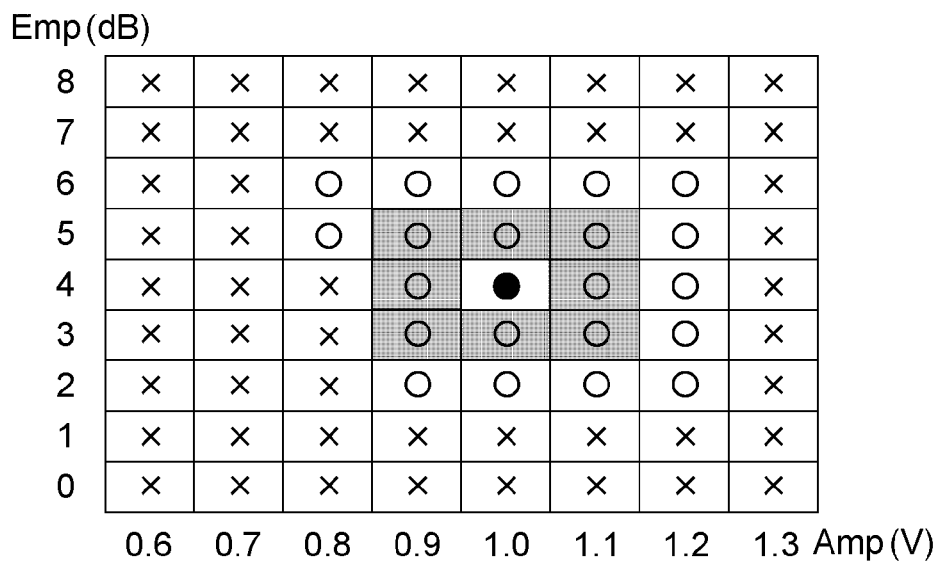
FIG. 6 is an explanatory diagram of the BER profile of a deteriorated communication cable.

In short, as the communication cable 30 is repeatedly inserted into and removed from the transmission/reception units 10 and 20, (the electrode portions of) the cable pads 31 of the communication cable 30 get deteriorated. Deterioration of a transmission characteristic of the communication cable 30, which is caused due to the deterioration of the cable pad 31, however, progresses normally in such a form that the BER profile illustrated in FIG. 5 varies to the BER profile depicted in FIG. 6 and further to the BER profile illustrated in FIG. 7.

Figure 8:
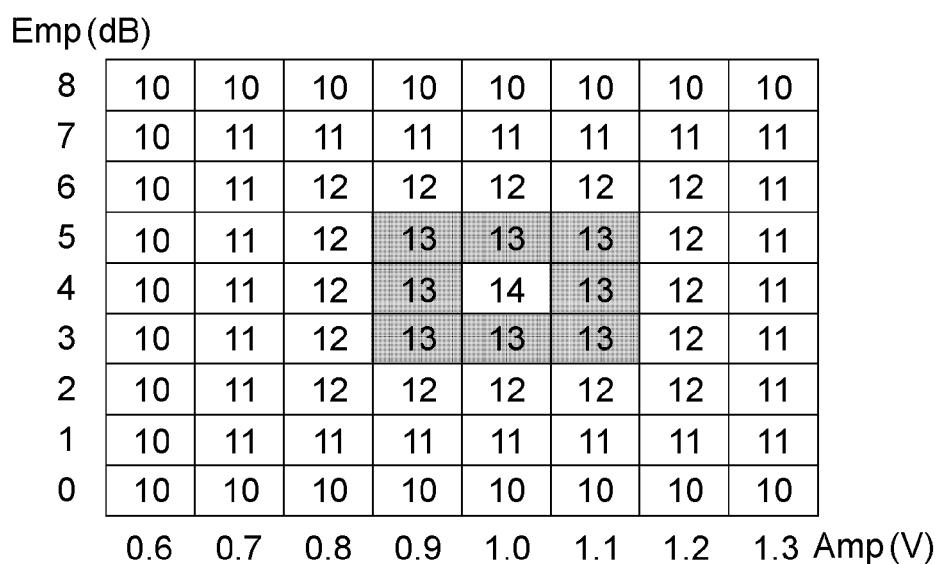
FIG. 8 is an explanatory diagram of the BER profile under respective signal conversion conditions.

To be more specific, an X-value in the case of notating the BER as $10^{-x}$ becomes a value as illustrated in FIG. 8. Namely, the X-value is maximized under a certain signal conversion condition (the signal conversion condition for the transmission described above) but decreases as a difference from this signal conversion condition increases. And, when the cable pad 31 of the communication cable 30 gets deteriorated, the X-value related to each signal conversion condition decreases on the whole, and it therefore follows that the BER profile varies as described above.

Figure 7:
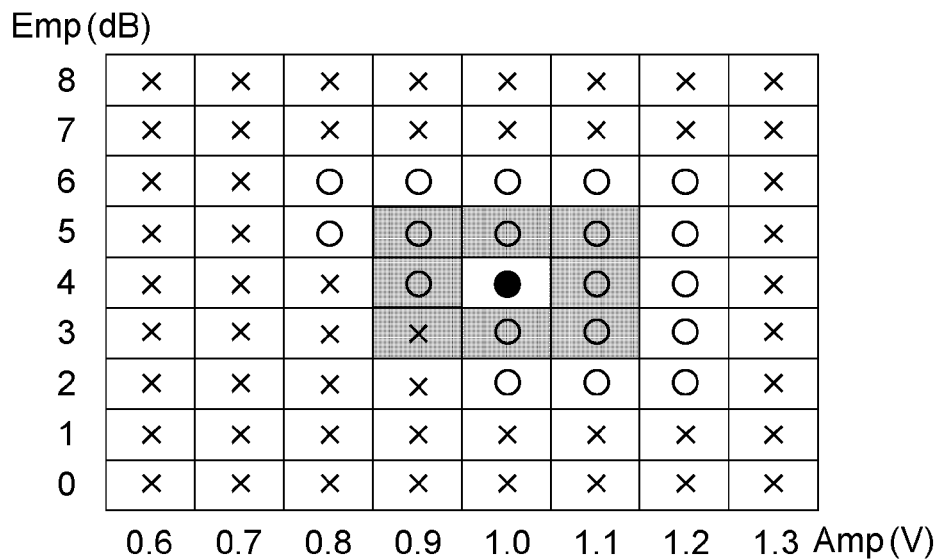
FIG. 7 is an explanatory diagram of the BER profile of a further deteriorated communication cable.

The diagnosis process (especially the processes in steps S102 and S105) executed by the transmission unit 10 is the process of determining whether the BER profile of the communication cable 30 becomes the profile depicted in FIG. 7 or not. Further, it is after the BER profile has become the profile depicted in FIG. 7 that the communication cable 30 comes to the status of being disabled from preferably transmitting the data under the signal conversion condition for the transmission.

Accordingly, each time the cable alarm is output (or alternatively when the cable alarm is output m-times continuously), the communication cable 30 used for the mass-production test is exchanged beforehand. With this contrivance, if disabled from preferably transmitting the data under the signal conversion condition for the transmission (step S104; NG), it can be resultantly determined without distinctively troubleshooting the error portion that the trouble exists in the transmission unit 10 and/or the reception unit (step S107).

Note that as apparent from the contents of the diagnosis process described above, the transmission unit 10 is configured as the unit which transmits the data converted into the signals under the signal conversion condition for the transmission to the reception unit 20. It is feasible to adopt a variety of methods of getting the CPU 14 of the transmission unit 10 to grasp the signal conversion condition for the transmission. For example, the BER profile is stored in the EEPROM 32 of the communication cable 30 used when in the actual operation, and, when starting up the transmission unit 10, the CPU 14 can be made to grasp the signal conversion condition with the largest margin as the signal conversion condition for the transmission on the basis of the BER profile. Moreover, the signal conversion condition for the transmission is stored beforehand in the EEPROM 32 of the communication cable 30 used when in the actual operation, and the CPU 14 can be made to read the signal conversion condition for the transmission from the EEPROM 32 when starting up the transmission unit 10. Further, it does not happen in most cases that the signal conversion conditions for the transmission of the same type of plural communication cables 30 differ depending on the communication cable 30. Hence, the signal conversion condition for the transmission can be also set in the transmission unit 10 as the information in the program and as the information on the nonvolatile storage device that is read by the program.

≤≤Second Embodiment≥≥

The discussion on the operation etc. of the transmission unit 10 according to a second embodiment will be focused on different portions from the transmission unit 10 according to the first embodiment in a way that uses the same reference numerals and symbols as those used when describing the first embodiment.

The transmission unit 10 (which will hereinafter be referred to also as a second transmission unit 10) according to the second embodiment is the unit connected to the reception unit 20 having the same configuration and the same functions as those of the reception unit 20 described above.

The second transmission unit 10 is, however, the unit configured to store the nonvolatile storage device with a second transmission-side diagnosis program of which contents are different from those of the transmission-side diagnosis program described above. Furthermore, the second transmission unit 10 is also the unit undergoing the mass-production test by using the communication cable 30 including the EEPROM 32 to which an insertion/removal count "1" is written in addition to the BER profile.

Figure 9:
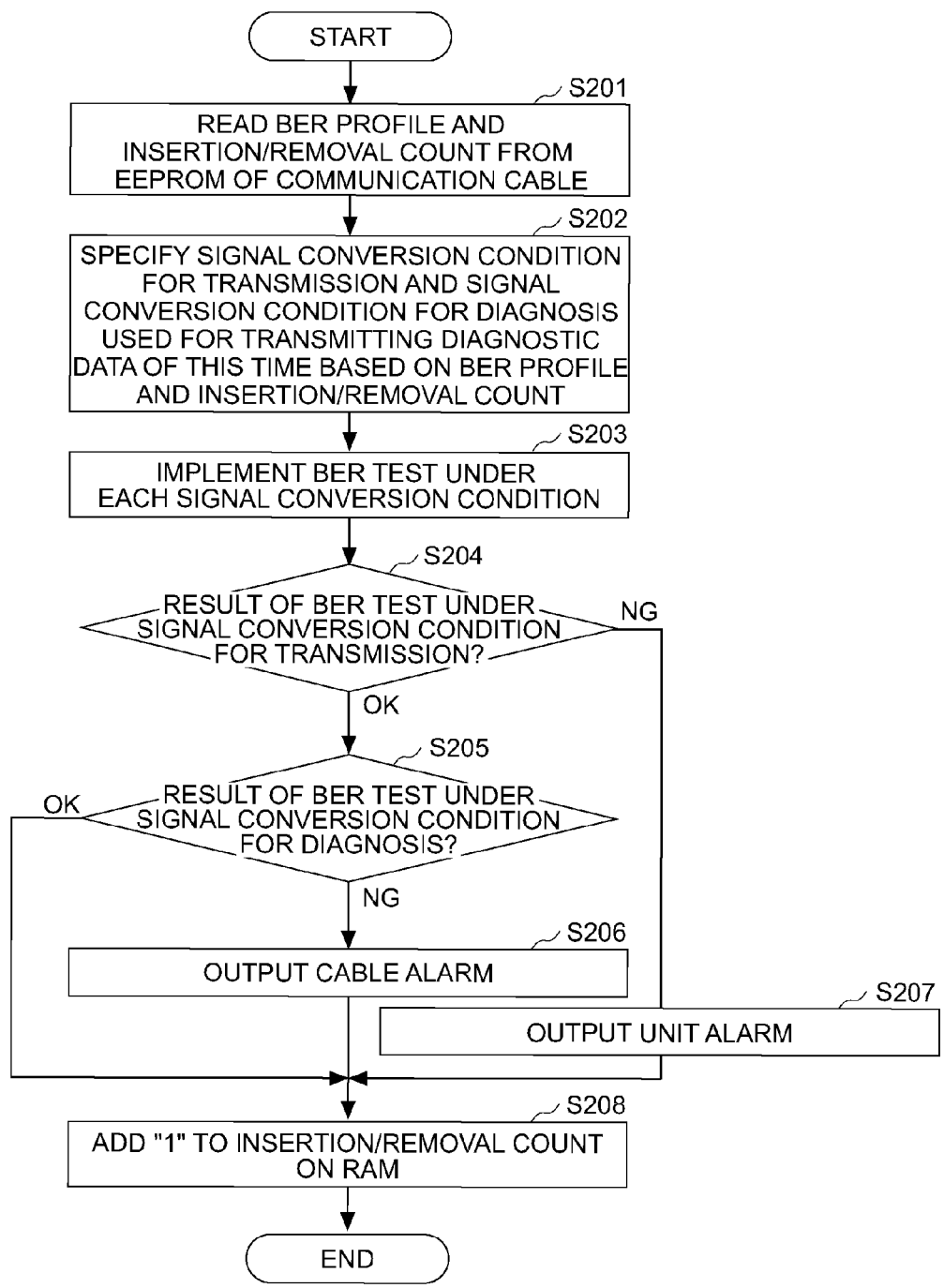
FIG. 9 is a flowchart of a second diagnosis process executed by a CPU in a transmission unit according to a second embodiment.

The second transmission-side diagnosis program is a program for making the CPU 14 execute a second diagnosis process taking a procedure illustrated in FIG. 9.

That is, the CPU 14, which has started the second diagnosis process, reads at first the BER profile and the insertion/removal count from the EEPROM 32 of the communication cable 30 (step S201).

Subsequently, the CPU 14 specifies, based on the readout BER profile and insertion/removal count, the signal conversion condition for the transmission and the signal conversion condition for the diagnosis used for transmitting the diagnostic data of this time (step S202).

When executing the process in step S202, the CPU 14 specifies, based on the BER profile read from the EEPROM 32, to start with, the signal conversion condition with the largest margin (which is the signal conversion condition positioned substantially at the center of the signal conversion condition group marked with "circle" in FIG. 3). Then, the CPU 14 stores, on the RAM, a purport that the specified signal conversion condition is defined as the signal conversion condition for the transmission.

Subsequently, when arranging the respective signal conversion conditions as illustrated in FIG. 3 (that is, when arranged in matrix in the sequence of the Amp values and in the sequence of the Emp values), the CPU 14 specifies each signal conversion condition adjacent to the signal conversion condition for the transmission as the signal conversion condition for the diagnosis. Then, the CPU 14 selects, from within the specified eight signal conversion conditions for the diagnosis, the signal conversion condition for the diagnosis different from the signal conversion condition for the diagnosis that is used for transmitting the diagnostic data of the last time as the signal conversion condition for the diagnosis that is employed for transmitting the diagnostic data of this time.

Figure 10:
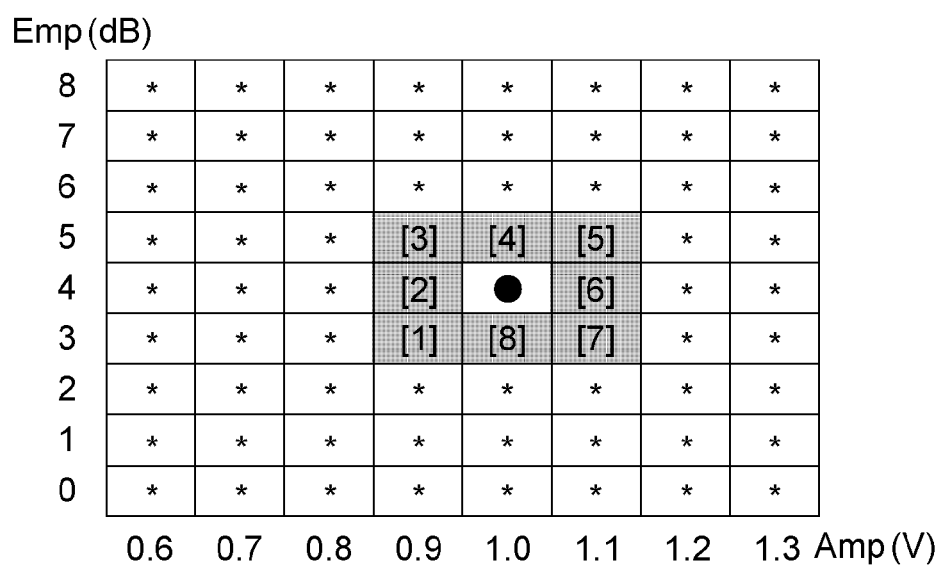
FIG. 10 is an explanatory diagram of contents of a second diagnosis process.

The CPU 14 exploits the insertion/removal count read from the EEPROM 32 when making this selection. Specifically, the CPU 14 calculates an n-value by an expression "n=(insertion/removal count mod 9)+1." Then, the CPU 14 specifies (selects), based on the calculated n-value, the signal conversion condition for the diagnosis that is marked with "n" in FIG. 10 as the signal conversion condition for the diagnosis that is used for transmitting the diagnostic data of this time.

The CPU 14, which has finished the process in step S202, implements the BER test under the specified two signal conversion conditions (step S203).

In the case of completing the BER test with respect to the two signal conversion conditions, the CPU 14 determines whether the result of the BER test under the signal conversion condition for the transmission is OK or NG (step S204). If the result of the BER test under the signal conversion condition for the transmission is OK (step S204; OK), the CPU 14 further determines whether the result of the BER test under the signal conversion condition for the diagnosis is OK or not (step S205).

Then, the CPU 14, if the result of the BER test under the signal conversion condition for the diagnosis is OK (step S205; OK), adds "1" to the insertion/removal count stored on the EEPROM 32 of the communication cable 30 (step S208) and thereafter finishes this second diagnosis process (the process in FIG. 9).

Whereas if the result of the BER test under the signal conversion condition for the diagnosis is NG (step S205; NG), the CPU 14 displays the cable alarm on the display of the PC 50 (step S206). Then, the CPU 14, which has finished the process in step S206, adds "1" to the insertion/removal count on the EEPROM 32 of the communication cable 30 (step S208), and thereafter finishes this second diagnosis process.

Further, if the result of the BER test under the signal conversion condition for the transmission is NG (step S204; NG), the CPU 14 displays the unit alarm indicating that the trouble exists in the transmission unit 10 and/or the reception unit 20 on the display of the PC 50 (step S207). Then, the CPU 14, which has finished the process in step S207, terminates this diagnosis process after executing the process in step S208.

As obvious from the description given above, the transmission unit 10 according to the second embodiment is the unit configured by modifying the transmission unit 10 according to the first embodiment so that the BER test is conducted only once under the signal conversion condition for the diagnosis when in the diagnosis process (the second diagnosis process). Then, the BER test takes a considerable period of time, but it does not mean that the data cannot be preferably transmitted under the signal conversion condition for the transmission immediately after the BER profile has become the profile as illustrated in FIG. 7. Accordingly, this transmission unit 10 can be said to be the device having no necessity for troubleshooting the error portion distinctively if the data cannot be preferably transmitted under the signal conversion condition for the transmission and also to be the device that completes the mass-production test in a shorter period of time than by the transmission unit 10 according to the first embodiment.

≦≦Third Embodiment≧≧

The discussion on the operation etc. of the transmission unit 10 according to a third embodiment will be focused on different portions from the transmission units 10 according to the first and second embodiments in a way that uses the same reference numerals and symbols as those used when describing the first and second embodiments.

The transmission unit 10 (which will hereinafter be referred to also as a third transmission unit 10) according to the third embodiment is the device having the same hardware configuration as the transmission units 10 according to the first and second embodiments have. The reception unit 20 (which will hereinafter be also termed a third reception unit 20) connected to the third transmission unit 10 is also the device having the same hardware configuration as the reception units 20 according to the first and second embodiments have. Then, the third transmission unit 10 is the device connected to the third reception unit 20 via the communication cable 30 including the EEPROM 32 not stored with the insertion/removal count as in the case of the transmission unit 10 according to the first embodiment.

The third reception unit 20 is, however, the unit configured so that the CPU 24 executes "a process of determining whether the BER is equal to or smaller than the system request value whenever notified of the BER of the diagnostic data from the reception chip 22 and notifying the CPU 14 of the determination result information" during the operation thereof. Moreover, the nonvolatile storage device of the third transmission unit 10 is stored with a third transmission-side diagnosis program for getting the CPU 14 in the third transmission unit 10 in the operation underway to periodically execute a third diagnosis process taking a procedure depicted in FIG. 1.

That is, the CPU 14 in the third transmission unit 10 periodically executes this third diagnosis process while carrying out the process of transmitting the data processed by the reception unit 20 in a way that exploits the transmission chip 12.

Then, when executing the third diagnosis process, the CPU 14 reads, at first, the BER profile from the EEPROM 32 of the communication cable 30 (step S301).

Subsequently, the CPU 14 specifies, based on the readout BER profile and a test count on the RAM, the signal conversion condition for the transmission and the signal conversion condition for the diagnosis that is used for transmitting the diagnostic data of this time (step S302). Note that the "test count on the RAM" connotes a value into which the CPU 14 sets, when starting up the third transmission unit 10, an initial value (e.g., "0") on the RAM and adds "1" to the initial value when executing a process in step S308 which will be described later on.

When executing the process in step S302, the CPU 14 specifies, based on the BER profile, the signal conversion condition with the largest margin. Then, the CPU 14 stores, on the RAM, a purport that the specified signal conversion condition is defined as the signal conversion condition for the transmission.

Subsequently, when arranging the respective signal conversion conditions as illustrated in FIG. 3, the CPU 14 specifies each of the signal conversion conditions neighboring to the signal conversion condition for the transmission as the signal conversion condition for the diagnosis. Then, the CPU 14 selects, from within the specified eight signal conversion conditions for the diagnosis, the signal conversion condition for the diagnosis different from the signal conversion condition for the diagnosis that is used for transmitting the diagnostic data of the last time as the signal conversion condition for the diagnosis that is employed for transmitting the diagnostic data of this time.

The CPU 14 exploits the test count on the RAM when making this selection. Specifically, the CPU 14 calculates an n-value by an expression "n=(test count mod 9)+1." Then, the CPU 14 specifies (selects), based on the calculated n-value, the signal conversion condition for the diagnosis that is marked with "n" in FIG. 10 as the signal conversion condition for the diagnosis that is used for transmitting the diagnostic data of this time.

The CPU 14, which has finished the process in step S302, implements the BER test under the specified two signal conversion conditions (step S303).

In the case of completing the BER test with respect to the two signal conversion conditions, the CPU 14 determines whether the result of the BER test under the signal conversion condition for the transmission is OK or NG (step S304).

If the result of the BER test under the signal conversion condition for the transmission is OK (step S304; OK), the CPU 14 further determines whether the result of the BER test under the signal conversion condition for the diagnosis is OK or not (step S305).

Then, the CPU 14, if the result of the BER test under the signal conversion condition for the diagnosis is OK (step S305; OK), adds "1" to the test count on the RAM (step S308) and thereafter finishes this third diagnosis process (the process in FIG. 11).

Whereas if the result of the BER test under the signal conversion condition for the diagnosis is NG (step S305; NG), the CPU 14 displays the cable alarm indicating a purport of reaching a status where it is undesirable that the communication cable 30 continues to be used (a purport of its being desirable to exchange the communication cable 30) on the display of the PC 50 (step S306).

Then, the CPU 14, which has finished the process in step S306, adds "1" to the test count on the RAM (step S308), and thereafter finishes this third diagnosis process.

Further, if the result of the BER test under the signal conversion condition for the transmission is NG (step S304; NG), the CPU 14 displays the unit alarm indicating that the trouble exists in the transmission unit 10 and/or the reception unit 20 on the display of the PC 50 (step S307). Then, the CPU 14, which has finished the process in step S307, terminates this second diagnosis process after executing the process in step S308.

As apparent from the description given above, the transmission unit 10 according to the third embodiment is the device configured by modifying the transmission unit 10 according to the second embodiment so that the same process as the second diagnosis process is periodically conducted during the operation.

Accordingly, this transmission unit 10 is the device configured not to troubleshoot the error portion distinctively if the data cannot be preferably transmitted under the signal conversion condition for the transmission and is also the device configured to be operable in such a form that the transmission error derived from the deterioration of the communication cable 30 does not occur.

≪≪Modified Embodiment≫≫

Figure 11:
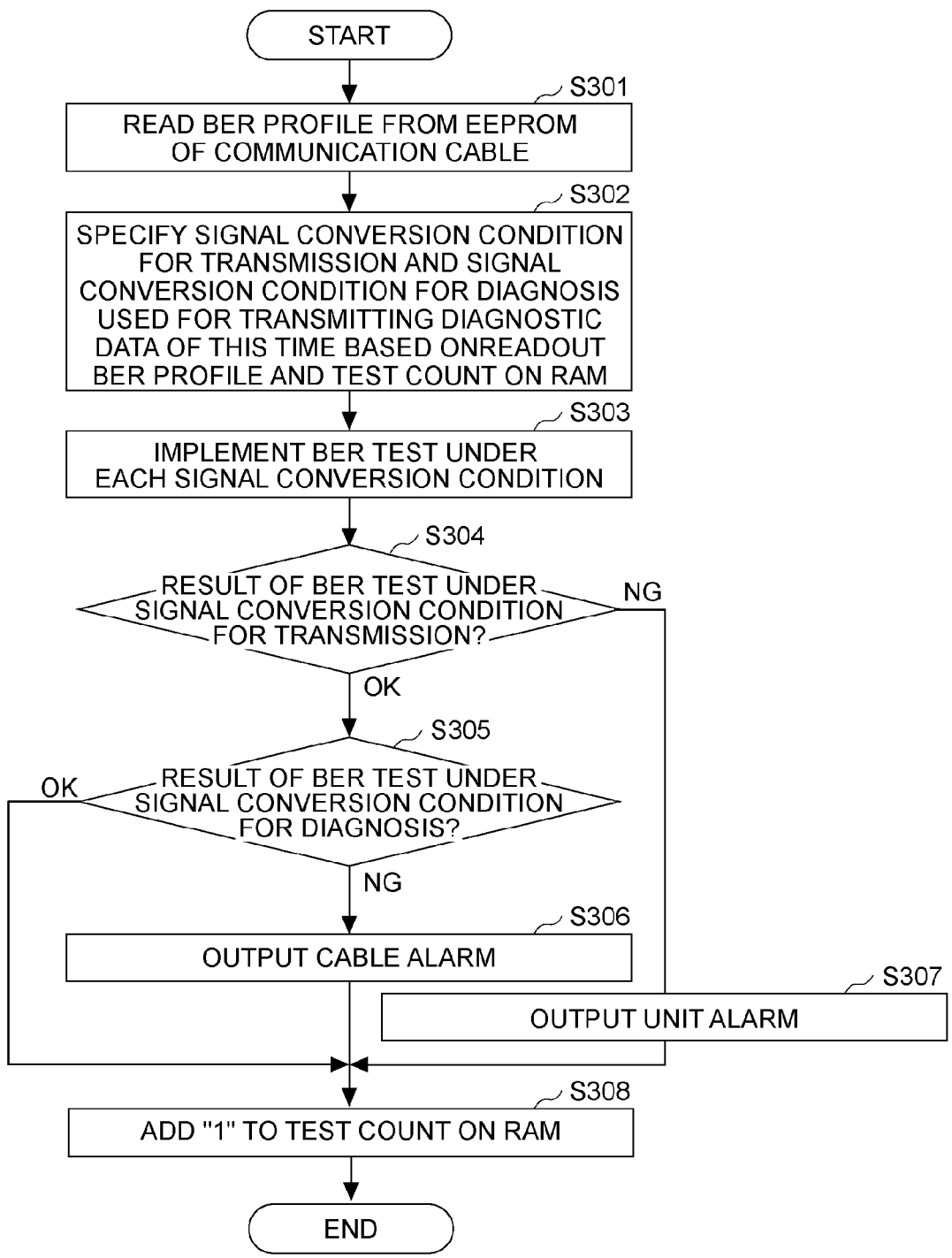
FIG. 11 is a flowchart of a third diagnosis process executed by a CPU in a transmission unit according to a third embodiment.

The technology in each of the embodiments discussed above can be modified in a variety of forms. For example, the transmission unit 10 according to the second embodiment can be modified into a unit specifying, based on the n-value calculated by an expression "n=(insertion/removal count mod 4)+1," the signal conversion condition for the diagnosis marked with "n" in FIG. 12 or 13 as the signal conversion condition for the diagnosis that is used in the process of this time in step S202 (FIG. 9). Further, the transmission unit 10 according to the third embodiment can be modified into a unit specifying, based on the n-value calculated by an expression "n=(test count mod 4)+1," the signal conversion condition for the diagnosis marked with "n" in FIG. 12 or 13 as the signal conversion condition for the diagnosis that is used in the process of this time in step S302 (FIG. 11).

Figure 12:
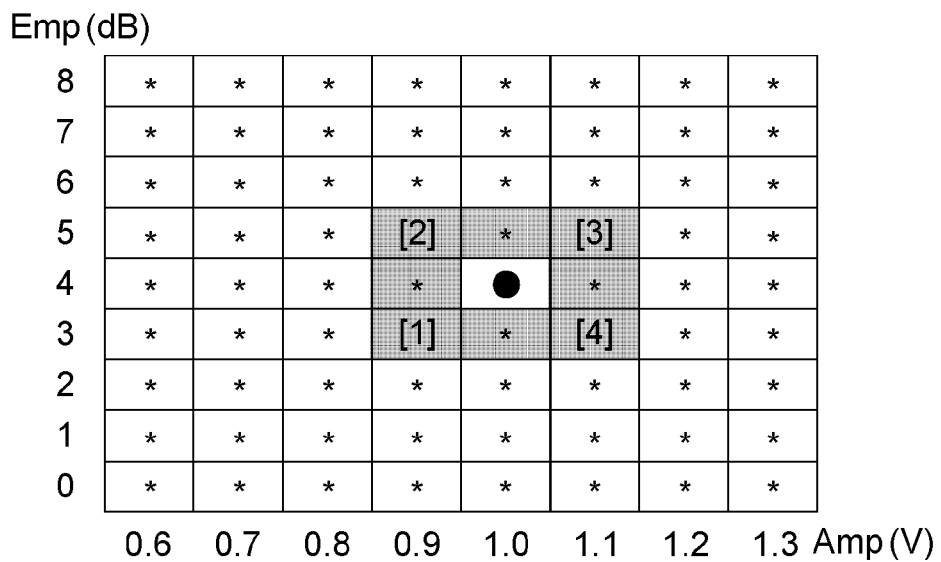
FIG. 12 is an explanatory diagram of modified examples of the second diagnosis process and the third diagnosis process.
Figure 13:
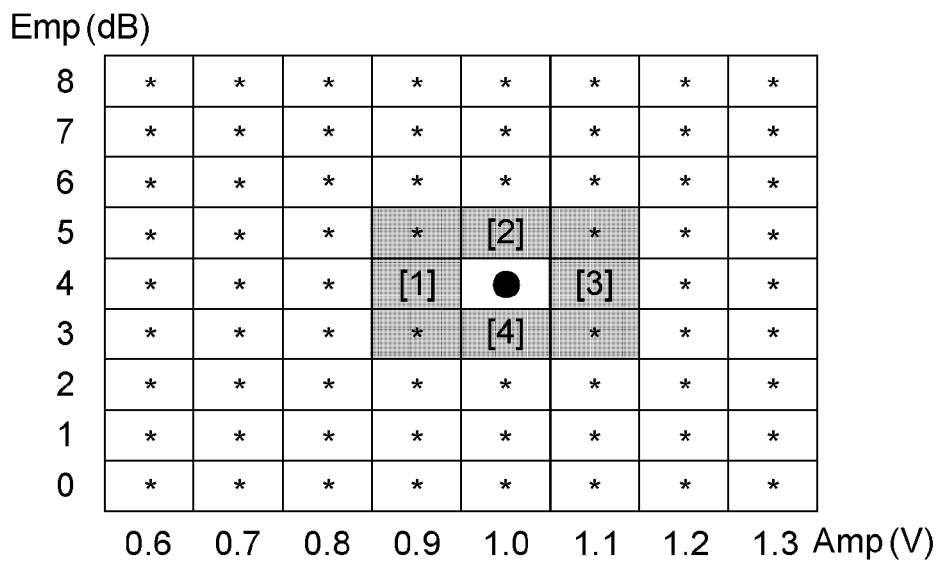
FIG. 13 is an explanatory diagram of modified examples of the second diagnosis process and the third diagnosis process.

The transmission unit 10 according to the first embodiment can be also modified into a unit configured to specify four signal conversion conditions for the diagnosis marked with "[1]" through "[4]" in FIG. 12 or 13 in step S102 (FIG. 4). Moreover, the reception unit 20 can be also configured to determine which alarm is output.

Furthermore, with regard to the above technology, the following note is disclosed.

(Note 1) An information processing apparatus, comprising:

a transmission unit; and a reception unit connected with the transmission unit via a communication cable, the transmission unit including, a diagnostic data transmitting function to transmit diagnostic data converted into signals under a signal conversion condition for a diagnosis, of which a value of at least one parameter is different from a signal conversion condition for a transmission defined as a data-to-signal conversion condition when transmitting the data to the reception unit, to the reception unit via the communication cable, and a diagnosing function to diagnose a status of the communication cable on the basis of a diagnostic data error rate measured by the reception unit receiving the diagnostic data.

(Note 2) The information processing apparatus according to note 1, wherein the reception unit has a function to transmit, to the transmission unit, error rate information indicating whether or not an error rate of the received diagnostic data exceeds a default value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A transmission unit connected to a reception unit via a communication cable, the transmission unit comprising:

a diagnostic data transmitting section to transmit, to the reception unit via the communication cable, diagnostic data converted into signals under a signal conversion condition for a diagnosis, of which a value of at least one parameter is different from a signal conversion condition for a transmission defined as a data-to-signal conversion condition for transmitting data to the reception unit; and a diagnosing section to diagnose a status of the communication cable on the basis of a diagnostic data error rate measured by the reception unit receiving the diagnostic data, wherein the signal conversion condition for the transmission is a signal conversion condition with a largest margin determined based on the diagnostic data whose bit error rate is equal to or smaller than a predetermined value and the signal conversion condition for the diagnosis is a signal conversion condition with a margin smaller than the largest margin.

2. The transmission unit according to claim 1, wherein the diagnosing section diagnoses, if the diagnostic data error rate exceeds a default value, that the communication cable comes to a status of its continuous use being undesirable and outputs information indicating that effect.

3. The transmission unit according to claim 1, wherein the diagnosing section receives error rate information indicating whether the received diagnostic data error rate exceeds the default value or not, then diagnoses, if the received error rate information indicates that the diagnostic data error rate exceeds the default value, that the communication cable comes to the status of its continuous use being undesirable and outputs the information indicating that effect.

4. The transmission unit according to claim 1, wherein the diagnostic data transmitting section transmits, with respect to each of a plurality of signal conversion conditions for the diagnosis of which a value of at least one parameter is different from the signal conversion condition for the transmission, the diagnostic data converted into signals under this signal conversion condition for the diagnosis to the reception unit via the communication cable, and the diagnosing section receives the error rate information indicating whether the error rate exceeds the default value or not for every transmitted diagnostic data, then diagnoses, if any one piece of received error rate information indicates that the diagnostic data error rate exceeds the default value, that the communication cable comes to the status of its continuous use being undesirable and outputs the information indicating that effect.

5. The transmission unit according to claim 1, wherein the diagnostic data transmitting section changes the signal conversion condition for the diagnosis each time the diagnostic data is transmitted.

6. The transmission unit according to claim 1, wherein the communication cable includes a nonvolatile memory stored with profile information containing an error rate in the case of transmitting, with respect to each of the plurality of signal conversion conditions, the diagnostic data under this signal conversion condition, and the diagnostic data transmitting section determines the signal conversion condition for the transmission and the signal conversion condition for the diagnosis on the basis of the profile information stored in the nonvolatile memory of the communication cable.

7. The transmission unit according to claim 3, wherein the a parameter for predetermining the signal conversion condition for the transmission contains a first parameter and a second parameter, and the plurality of signal conversion conditions for the diagnosis are conditions selected from within eight signal conversion conditions different from the signal conversion condition for the transmission, in which a value of the first parameter is any one of a first value larger than the value of the first parameter of the signal conversion condition for the transmission, a second value equal to the value of the first parameter of the signal conversion condition for the transmission and a third value smaller than the value of the first parameter of the signal conversion condition for the transmission, and a value of the second parameter is any one of a fourth value larger than the value of the second parameter of the signal conversion condition for the transmission, a fifth value equal to the value of the second parameter of the signal conversion condition for the transmission and a sixth value smaller than the value of the second parameter of the signal conversion condition for the transmission.

8. A diagnosis method of diagnosing a communication cable connecting a transmission unit to a reception unit, the diagnosis method comprising:
   transmitting, via the communication cable from the transmission unit to the reception unit, diagnostic data converted into signals under a signal conversion condition for a diagnosis, of which a value of at least one parameter is different from a signal conversion condition for a transmission defined as a data-to-signal conversion condition for transmitting data to the reception unit; and
   diagnosing a status of the communication cable on the basis of a diagnostic data error rate measured by the reception unit receiving the diagnostic data,
   wherein the signal conversion condition for the transmission is a signal conversion condition with a largest margin determined based on the diagnostic data whose bit error rate is equal to or smaller than a predetermined value and the signal conversion condition for the diagnosis is a signal conversion condition with a margin smaller than the largest margin.

9. The diagnosis method according to claim 8, wherein the diagnosing diagnoses, if the diagnostic data error rate exceeds a default value, that the communication cable comes to a status of its continuous use being undesirable and outputs information indicating that effect.

10. A non-transitory computer-readable recording medium having stored therein a program for a transmission unit including a processor and a communication part to convert bit information into signal and to transmit the signal via a communication cable to a reception unit, the program causing the processor to execute a process comprising:
   transmitting, by the communication part, diagnostic data converted into signals under a signal conversion condition for a diagnosis, of which a value of at least one parameter is different from a signal conversion condition for a transmission defined as a data-to-signal conversion condition for transmitting data to the reception unit; and
   diagnosing a status of the communication cable on the basis of a diagnostic data error rate measured by the reception unit receiving the diagnostic data,
   wherein the signal conversion condition for the transmission is a signal conversion condition with a largest margin determined based on the diagnostic data whose bit error rate is equal to or smaller than a predetermined value and the signal conversion condition for the diagnosis is a signal conversion condition with a margin smaller than the largest margin.

11. The transmission unit according to claim 1, wherein an amplitude of the diagnostic data is varied under the signal conversion condition for the diagnosis different from the signal conversion condition for the transmission.

12. A transmission unit connected to a reception unit via a communication cable, the transmission unit comprising:
   a diagnostic data transmitting section to transmit, to the reception unit via the communication cable, diagnostic data converted into signals under a signal conversion condition for a diagnosis, of which a value of at least one parameter is different from a signal conversion condition for a transmission defined as a data-to-signal conversion condition for transmitting data to the reception unit; and
   a diagnosing section to diagnose a status of the communication cable on the basis of a diagnostic data error rate measured by the reception unit receiving the diagnostic data,
   wherein the diagnosing section receives error rate information indicating whether the received diagnostic data error rate exceeds the default value or not, then diagnoses, if the received error rate information indicates that the diagnostic data error rate exceeds the default value, that the communication cable comes to the status of its continuous use being undesirable and outputs the information indicating that effect, and
   the a parameter for predetermining the signal conversion condition for the transmission contains a first parameter and a second parameter, and the plurality of signal conversion conditions for the diagnosis are conditions selected from within eight signal conversion conditions different from the signal conversion condition for the transmission, in which a value of the first parameter is any one of a first value larger than the value of the first parameter of the signal conversion condition for the transmission, a second value equal to the value of the first parameter of the signal conversion condition for the transmission and a third value smaller than the value of the first parameter of the signal conversion condition for the transmission, and a value of the second parameter is any one of a fourth value larger than the value of the second parameter of the signal conversion condition for the transmission, a fifth value equal to the value of the second parameter of the signal conversion condition for the transmission and a sixth value smaller than the value of the second parameter of the signal conversion condition for the transmission.

\* \* \* \* \*